US010838727B2

(12) United States Patent
Das et al.

(10) Patent No.: US 10,838,727 B2
(45) Date of Patent: Nov. 17, 2020

(54) DEVICE AND METHOD FOR CACHE UTILIZATION AWARE DATA COMPRESSION

(71) Applicant: Advanced Micro Devices, Inc., Santa Clara, CA (US)

(72) Inventors: Shomit N. Das, Austin, TX (US); Kishore Punniyamurthy, Austin, TX (US); Matthew Tomei, Champaign, IL (US); Bradford M. Beckmann, Bellevue, WA (US)

(73) Assignee: ADVANCED MICRO DEVICES, INC., Santa Clara, CA (US)

( * ) Notice: Subject to any disclaimer, the term of this patent is extended or adjusted under 35 U.S.C. 154(b) by 48 days.

(21) Appl. No.: 16/220,508

(22) Filed: Dec. 14, 2018

(65) Prior Publication Data

US 2020/0192671 A1 Jun. 18, 2020

(51) Int. Cl.
*G06F 12/08* (2016.01)
*G06F 9/38* (2018.01)
*G06F 12/0808* (2016.01)
*G06F 12/0871* (2016.01)
*G06F 12/0868* (2016.01)

(52) U.S. Cl.
CPC ........ *G06F 9/3816* (2013.01); *G06F 12/0808* (2013.01); *G06F 12/0868* (2013.01); *G06F 12/0871* (2013.01)

(58) Field of Classification Search
CPC .............. G06F 9/3816; G06F 12/0808; G06F 12/0868; G06F 12/0871; G06F 12/0888

USPC .................... 710/68; 711/118, 137
See application file for complete search history.

(56) References Cited

U.S. PATENT DOCUMENTS

| 2014/0281258 | A1* | 9/2014 | Callaway | ............ G06F 12/0891 711/135 |
| 2015/0381201 | A1* | 12/2015 | Ansari | ................ H03M 7/3084 341/87 |
| 2016/0283390 | A1* | 9/2016 | Coulson | ................ G06F 12/127 |
| 2020/0019329 | A1* | 1/2020 | Faibish | ................ G06F 3/0641 |

OTHER PUBLICATIONS

Mittal S. et al., "A Survey of Architectural Approaches for Data Compression in Main and Cache Memory Systems", IEEE Transactions on Parallel and Distributed Systems, vol. 27, Issue 5, pp. 1524-1536, IEEE, May 2016.

* cited by examiner

*Primary Examiner* — Gary J Portka
(74) *Attorney, Agent, or Firm* — Volpe Koenig

(57) ABSTRACT

A processing device is provided which includes memory and at least one processor. The memory includes main memory and cache memory in communication with the main memory via a link. The at least one processor is configured to receive a request for a cache line and read the cache line from main memory. The at least one processor is also configured to compress the cache line according to a compression algorithm and, when the compressed cache line includes at least one byte predicted not to be accessed, drop the at least one byte from the compressed cache line based on whether the compression algorithm is determined to successfully compress the cache line according to a compression parameter.

20 Claims, 4 Drawing Sheets

DEVICE AND METHOD FOR CACHE UTILIZATION AWARE DATA COMPRESSION

STATEMENT REGARDING FEDERALLY SPONSORED RESEARCH OR DEVELOPMENT

This invention was made with Government support under the PathForward Project with Lawrence Livermore National Security (Prime Contract No. DE-AC52-07NA27344, Subcontract No. B620717) awarded by the DOE. The Government has certain rights in this invention.

BACKGROUND

The constant movement of data (e.g., video data) at various memory hierarchies of on-chip and off-chip network architectures increases the memory bandwidth (e.g., the rate at which the data is read from or stored into memory) and interconnect bandwidth (e.g., the rate at which data across is transferred across interconnect links between processor cores, caches, and memory stacks) as well as power consumption (e.g., power to transfer data to and from memory). To reduce memory bandwidth, interconnect bandwidth and power consumption, the data is typically encoded (e.g., compressed) using any number of different types of encoding (e.g., compression) techniques.

Conventional encoding techniques include compressing data at various stages of a data processing pipeline (e.g., link compression, cache compression) depending on a particular objective. For example, link compression shares a model of the data at the encoding and decoding sides of links to provide high compression ratios (e.g., ratio between the uncompressed size of data and compressed size of the data or ratio between compressed data rate and uncompressed data rate), which reduces the amount of data (or data rate) sent between links. Cache compression stores additional cache lines in compressed form, which increases cache capacity without increasing cache size (e.g., cache area).

BRIEF DESCRIPTION OF THE DRAWINGS

A more detailed understanding can be had from the following description, given by way of example in conjunction with the accompanying drawings wherein.

DETAILED DESCRIPTION

Figure 1:
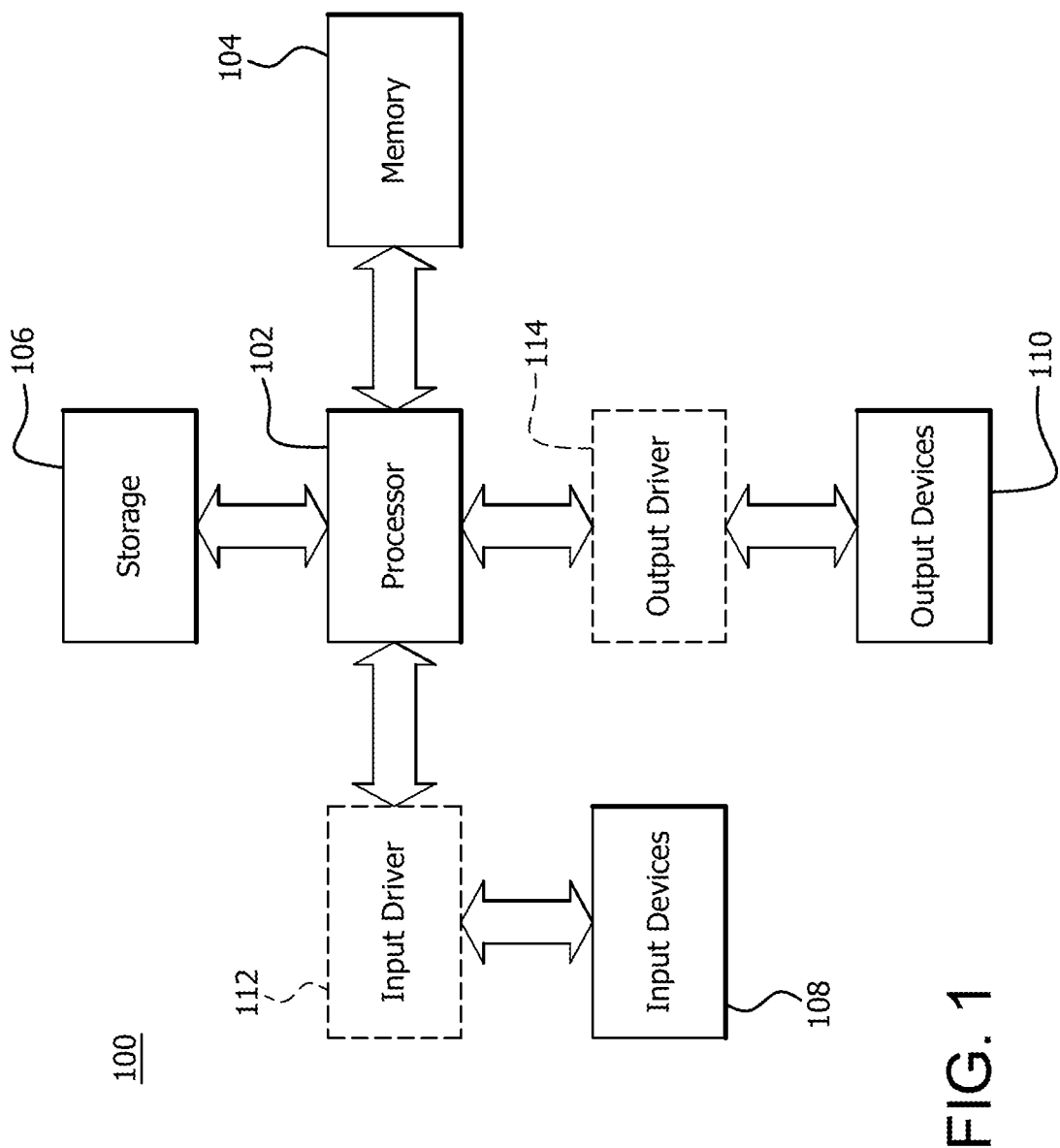
FIG. 1 is a block diagram of an example device in which one or more features of the disclosure can be implemented.

While link compression and data compression each facilitate reducing data movement and increasing cache capacity, the success rate of a particular compression algorithm (e.g., the number of bits eliminated from memory transmission or storage) depends on the data being compressed. For example, conventional techniques return each byte of a cache line (or cache block) from main memory when a cache miss (e.g., a last level cache (LLC) miss) occurs, and each byte of the cache line is sent across an interconnect link (e.g., bus). Each byte of a cache line is not typically accessed (i.e., not used to execute a program) during the life of the cache line, however, due to various factors (e.g., nature of the workload, interference, data footprint size). That is, a cache line is often evicted before each byte of the cache line is accessed, resulting in unused (i.e., unaccessed) bytes being transferred across the links and stored in the cache.

Each of the bytes in the cache line, including the unused bytes, consume link bandwidth (i.e., interconnect bandwidth) and cache capacity, negatively impacting the efficiency of the compression algorithm. In addition, conventional compression techniques, such as conventional link compression techniques, do not efficiently transfer each cache line across an interconnect link or efficiently store the data in the cache.

The present application provides devices and methods which efficiently compress data by dropping bytes of a cache line which are not predicted to be accessed (i.e., non-useful bytes). The prediction is implemented on a byte granularity level (i.e., each byte of a cache line). The devices and methods described herein are implemented for both link compression and cache compression. For example, the dropped non-useful bytes result in less bytes moving across a link (e.g., a bus) facilitating a reduction in the number of cycles used to send each cache line across the link. When used to implement cache compression, the dropped non-useful bytes result in additional cache lines being stored, increasing the effective cache capacity without increasing cache size (e.g., cache area).

A processing device is provided which includes memory and at least one processor. The memory includes main memory and cache memory in communication with the main memory via a link. The at least one processor is configured to receive a request for a cache line, read the cache line from main memory and compress the cache line according to a compression algorithm. When the compressed cache line includes at least one byte predicted to not be accessed, the at least one processor is configured to drop the at least one byte from the compressed cache line based on whether the compression algorithm is determined to successfully compress the cache line according to a compression parameter.

A data processing method is provided which includes receiving a request for a cache line and reading the cache line from main memory. The method also includes compressing the cache line according to a compression algorithm and when the compressed cache line includes at least one byte predicted to not be accessed, dropping the at least one byte from the compressed cache line based on whether the compression algorithm is determined to successfully compress the cache line according to a compression parameter.

A non-transitory computer readable medium is provided which includes instructions for causing a computer to execute a data processing method. The instructions include receiving a request for a cache line and reading the cache line from main memory. The instructions also include compressing the cache line according to a compression algorithm and, when the compressed cache line includes at least one byte predicted to not be accessed, dropping the at least one byte from the compressed cache line based on whether the compression algorithm is determined to successfully compress the cache line according to a compression parameter.

As used herein, programs include sequences of instructions to be executed using at least one processor to perform procedures or routines (e.g., operations, computations, functions, processes, jobs). Processing of programmed instructions and data includes one or more of a plurality of processing stages, such as but not limited to fetching, decoding, scheduling for execution, executing and decoding the programmed instructions and data. Programmed instructions include, for example, applications and control programs, such as operating systems.

FIG. 1 is a block diagram of an example device 100 in which one or more features of the disclosure can be implemented. The device 100 can include, for example, a computer, a gaming device, a handheld device, a set-top box, a television, a mobile phone, or a tablet computer. The device 100 includes a processor 102, a memory 104, a storage 106, one or more input devices 108, and one or more output devices 110. The device 100 can also optionally include an input driver 112 and an output driver 114. It is understood that the device 100 can include additional components not shown in FIG. 1.

In various alternatives, the processor 102 includes a central processing unit (CPU), a graphics processing unit (GPU), a CPU and GPU located on the same die, or one or more processor cores, wherein each processor core can be a CPU or a GPU. In various alternatives, the memory 104 is located on the same die as the processor 102, or is located separately from the processor 102. The memory 104 includes volatile or non-volatile memory, for example, random access memory (RAM), including dynamic RAM (DRAM) and static RAM (SRAM). The memory 104 includes cache memory such as a data cache and a metadata cache, as described in detail herein.

The storage 106 includes a fixed or removable storage, for example, a hard disk drive, a solid state drive, an optical disk, or a flash drive. The input devices 108 include, without limitation, a keyboard, a keypad, a touch screen, a touch pad, a detector, a microphone, an accelerometer, a gyroscope, a biometric scanner, or a network connection (e.g., a wireless local area network card for transmission and/or reception of wireless IEEE 802 signals). The output devices 110 include, without limitation, a display, a speaker, a printer, a haptic feedback device, one or more lights, an antenna, or a network connection (e.g., a wireless local area network card for transmission and/or reception of wireless IEEE 802 signals).

The input driver 112 communicates with the processor 102 and the input devices 108, and permits the processor 102 to receive input from the input devices 108. The output driver 114 communicates with the processor 102 and the output devices 110, and permits the processor 102 to send output to the output devices 110. It is noted that the input driver 112 and the output driver 114 are optional components, and that the device 100 will operate in the same manner if the input driver 112 and the output driver 114 are not present.

One or more components, such as processor 102, and memory 104 described herein are, for example, components a system on chip (SOC) used in an integrated circuit (e.g., application-specific chip) included in device 100.

Figure 2:
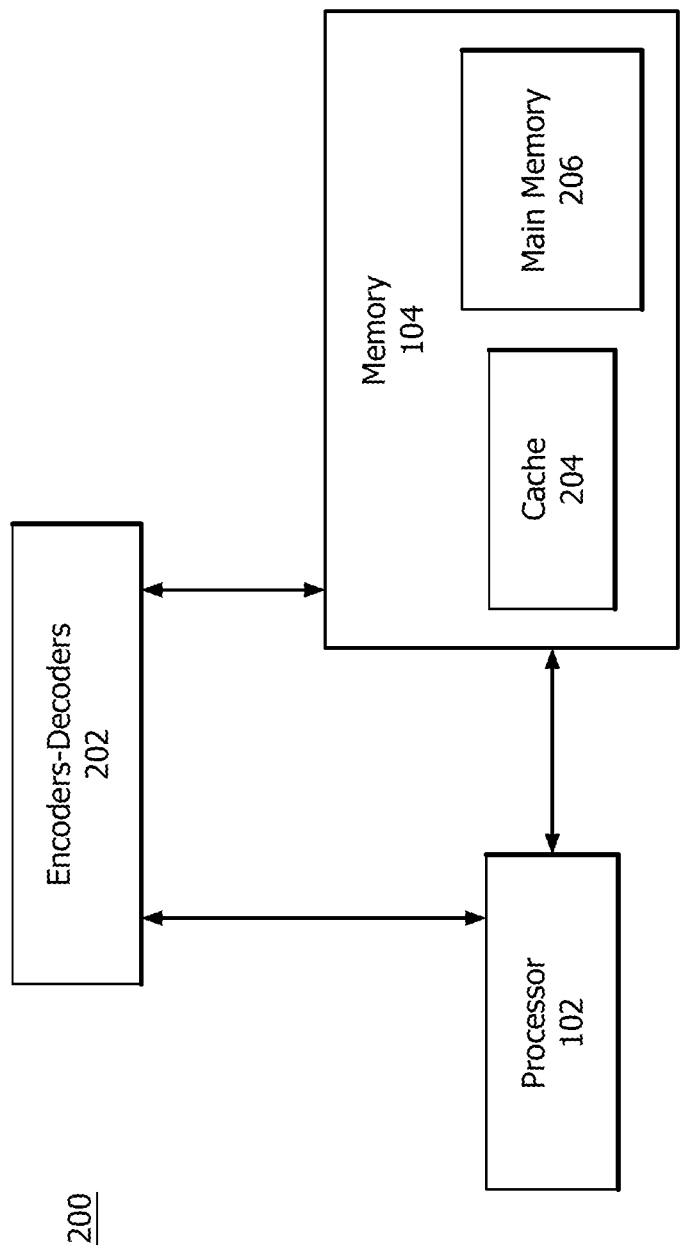
FIG. 2 is a block diagram illustrating exemplary components of a processing device in which one or more features of the disclosure can be implemented.

FIG. 2 is a block diagram illustrating exemplary components of a processing device 200 in which one or more features of the disclosure can be implemented. As shown in FIG. 2, processing apparatus 200 includes processor 102, memory 104 and encoder-decoder 202 (e.g., encoder, decoder or combined encoder-decoder (i.e., CODEC)).

Encoder-decoder 202 includes any number of encoders and decoders (e.g., encoder-decoders at different sides of a interconnect link of processing device 200). Each encoder-decoder 202 includes, for example, a compressor configured to compress data (e.g., video data) using various compression algorithms (e.g., link compression algorithms and cache compression algorithms) and a decompressor configured to decompress the data compressed by the various compression algorithms. Encoder-decoder 202 is, for example, implemented in hardware, software or a combination of hardware and software to compress data for executing a program. Encoder-decoder 202 is controlled by a processor 102 to compress data using an encoding and decompress data using a decoding. Each encoding and decoding is a way or a process of representing data to compress and decompress the data, respectively (e.g., a link compression algorithm or a cache compression algorithm).

Memory 104 includes cache 204 and main memory 206. Cache 204 includes any number of cache levels, including a single cache and plurality of caches of cache hierarchy (e.g., L1 cache, L2 cache, . . . Ln cache). Data is sent between main memory 206 and cache 204 via an interconnect link (e.g., a bus) as described in more detail below.

The processor 102 is, for example, used to control multiple components, including encoder-decoder 202, of the processing device 200. Alternatively, processor 102 includes multiple processors each used to control a single component. For example, processor 102 includes a processor dedicated to encoder-decoder 202. Processor 102 includes any number of cache controllers each configured to control a single cache or multiple level caches. As described in more detail below, processor 102 is used to control each component to facilitate various tasks, including but not limited to, reading and writing data, compressing and decompressing data (e.g., cache lines) predicting useful/non-useful bytes of a cache line, determining a compression success rate and dropping of non-useful bytes of a cache line.

Figure 3:
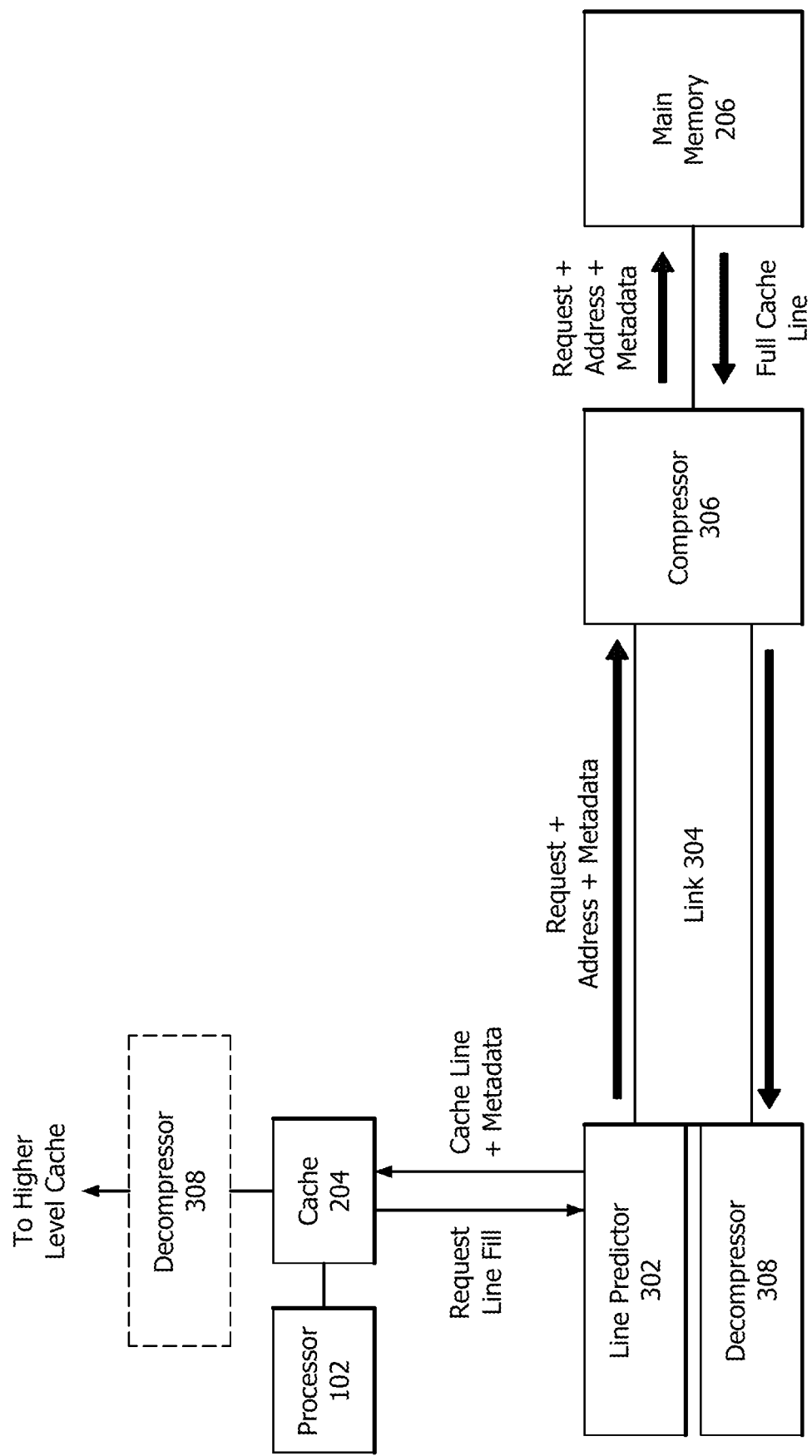
FIG. 3 is a block diagram illustrating an example flow of compressing data in which one or more features of the disclosure can be implemented.

FIG. 3 is a block diagram illustrating an example flow of processing data in which one or more features of the disclosure can be implemented. The components and techniques shown in FIG. 3 and described below facilitate a reduction in memory cycles when used to implement link compression and an increased effective cache capacity when used to implement cache compression.

Link compression techniques include the removal of redundant data in a cache line to reduce the number of bus cycles used to transfer a cache line over a link (e.g., a bus). Success of a particular link compression algorithm is, for example, determined by whether the compression algorithm reduces the number of cycles (e.g., bus cycles) used to send the data in the cache line over the link. For example, when uncompressed data in a 64-byte cache line is sent over a 32-byte bus, the data is sent over 2 bus cycles (i.e., 32-bytes per cycle). A compression algorithm which compresses the 64 bytes in the cache line to 34 bytes does remove 30 redundant bytes of data from the cache line. This compression algorithm is not a successful link compression algorithm, however, because 2 cycles are still used to send the compressed data of the cache line across the link despite the elimination of 30 redundant bytes from the cache line.

The cache line utilization predictor 302, the cache line compressor 306 and the decompressor 308 shown in FIG. 3 are, for example, implemented in hardware (e.g., logic gates), software (e.g., programmed instructions), or a combination of software and hardware. The cache line utilization predictor 302, the cache line compressor 306 or the decompressor 308 are, for example, implemented using one or more processors (not shown), separate from processor 102, to implement any of the functions performed by these components (e.g., such as when either component is implemented at least in part using software. Alternatively, the cache line utilization predictor 302, the cache line compressor 306 or the decompressor 308 are implemented in hardware without processor control. As described above, cache 204 includes any number of caches at different levels of the cache hierarchy. When multiple cache levels are implemented, cache 204 shown in FIG. 3 represents the last level cache in the cache hierarchy.

In response to a request for data during execution of a program, when processor 102 does not find the data at a memory address in its local cache 204, a cache miss (e.g., a last level cache miss) occurs and the processor 102 sends a request to fill a cache line (i.e., Request Line Fill shown in FIG. 3) of the cache 204 and the cache line address to the cache line utilization predictor 302.

In response to the request to fill the cache line, cache line utilization predictor 302 predicts, for each byte of a cache line, whether a byte will be accessed before the cache line is evicted from the cache 204. That is, cache line utilization predictor 302 is controlled by processor 102 to predict, for each byte of a cache line, whether a byte is a useful byte (i.e., a byte will be accessed).

The prediction is based on previous requests to access data of the cache line. For example, the processor 102 monitors and stores, over time, requests to access each byte (i.e., a byte granularity level) in the cache line from multiple portions (e.g., threads) of a program. The number of accesses for each byte of the cache line is sampled to predict the bytes of the cache line to be accessed (i.e., the useful bytes). The processor 102 uses the information (e.g., the stored number of accesses for each byte) to predict, for each byte of the cache line, whether the byte will be accessed (e.g., will be accessed before the cache line is evicted from the cache 204). The processor 102 sends the request to fill the cache line across the link 304 along with metadata, which includes prediction information comprising the prediction of whether or not each byte will be accessed, and the cache line address.

In response to receiving the request, each byte of the cache line (i.e., Full Cache Line) is sent to the compressor 306. For example, in response to receiving the request, the metadata and the cache line address, processor 102 (e.g., memory controller) reads each byte of the cache line from main memory 206 and sends each byte of the cache line to the compressor 306.

Compressor 306 is, for example, implemented in hardware (e.g., a part of encoder-decoder 202 shown in FIG. 2), software or a combination of hardware and software used to compress data for executing a program. Compressor 306 is controlled by a processor 102 (e.g., a processor dedicated to compressor 306 or a processor used to control other components, such as main memory 206) to compress the cache line using a compression algorithm.

Processor 102 also controls the compressor 306 to determine whether the compression algorithm has successfully compressed the cache line according to a compression parameter. In this example, a cache line is determined as being successfully compressed if the compressed cache line, including the metadata, can be sent over the link 304 in a fewer number of cycles. For example, referring to the 64-byte cache line and 32-byte bus example described above, the cache line is determined to be successfully compressed when the compression results in the number of bytes of the compressed cache line being reduced from 64 bytes to 32 bytes or less such that the compressed cache line, including the metadata, can be sent over a single bus cycle.

Referring again to FIG. 3, when the processor 102 determines that the compression algorithm has successfully compressed the cache line according to the compression parameter, an indication of the successful compression is recorded (e.g., counter is updated) and the processor 102 sends the compressed cache line across the link 304.

When the processor 102 determines that the compression algorithm has not successfully compressed the cache line according to the compression parameter, an indication of the unsuccessful compression is recorded (e.g., counter is updated) and the processor 102 implements the dropping byte algorithm. The dropping byte algorithm is, for example, implemented by determining whether there are any droppable bytes to drop from the cache line based on the prediction information indicating whether there are any bytes in the cache line predicted to be accessed (i.e., useful bytes).

Alternatively, prior to determining whether there are any droppable bytes to drop from the cache line, the dropping byte algorithm is implemented by the processor 102 by first determining whether or not a compression success rate is less than a compression success rate threshold. For example, processor 102 determines the compression success rate by monitoring and recording successful compressions and unsuccessful compressions (e.g., updating the counter). The compression success rate is then determined based on the recorded success information. The processor 102 compares the determined compression success rate to the compression success rate threshold.

When the processor 102 determines that the compression success rate is not less than the compression success rate threshold (i.e., the cache lines are being successfully compressed according to the compression success rate threshold without dropping any bytes), the compressed cache line is sent across the link 304 without dropping any bytes from the cache line. For example, when the processor 102 determines the compression algorithm has not successfully compressed the cache line but also determines that the compression success rate is not less than the compression success rate threshold (e.g., via an indication of an "enable_dropping" flag), the counter is updated to indicate the unsuccessful compression, but the compressed cache line is sent across the link 304 without implementing the dropping byte algorithm. When the processor 102 determines that the compression success rate is less than the compression success rate threshold (i.e., the cache lines are not being successfully compressed according to the compression success rate threshold without dropping any bytes), the processor 102 implements the dropping byte algorithm by determining whether the cache line includes any non-useful bytes.

If the compression success rate threshold algorithm is not used, the processor 102 implements the dropping byte algorithm upon determining that the compression algorithm has not successfully compressed the cache line according to the compression parameter. That is, upon determining that the compression algorithm has not successfully compressed the cache line according to the compression parameter, the processor 102 determines whether or not there are any droppable bytes (i.e., non-useful bytes) to drop from the cache line based on the metadata which includes the prediction information indicating the bytes in the cache line predicted to be accessed (i.e., useful bytes).

When the processor 102 determines that there are droppable bytes in the cache line, the processor 102 begins dropping the non-useful bytes, one at a time, from the cache line. The processor 102 determines, after each byte is dropped from the cache line, whether the compression becomes successful (e.g., the bytes in the cache line are reduced to 32 bytes to send across the 32-byte bus). When the processor 102 determines that the compression becomes successful, the processor 102 sends the cache line with the dropped bytes (i.e., partial cache line) across the link 304 without dropping any additional non-useful bytes from the compressed cache line. The metadata in the compressed partial cache line is augmented with an indication (e.g., a flag) that the cache line includes dropped bytes. When the processor 102 determines that the compression still does not become successful after each non-useful byte is dropped, the processor 102 sends the compressed cache line across the link 304 without any bytes dropped (i.e., the compressed cache line before any bytes were dropped).

Upon receiving the cache line across the link 304, decompressor 308 decompresses the cache line and sends the cache line and the metadata including the prediction information and, when included, any information indicating that the cache line includes dropped bytes. Decompressor 308 is controlled by a processor 102 (e.g., a processor dedicated to decompressor 308 or a processor used to control other components, such as cache line predictor 302 and cache 204)) to decompress each portion of data using a decompression algorithm.

The decompressor 308 identifies invalid bytes of the cache line (i.e., dropped bytes which are requested to be accessed after the cache line is sent across the link with at least one dropped byte) by using the bytes' associated write masks. When these invalid bytes are requested, the entire cache line is invalidated.

The techniques described above with regard to the example illustrated in FIG. 3 are implemented to compress data to reduce the number of bus cycles as part of a link compression scheme. The techniques described above are also used to efficiently compress data to increase effective cache capacity (i.e., increase cache capacity without increasing cache size (e.g., cache area)) as part of a cache compression scheme except that the compressed data is stored in the cache 204 prior to being decompressed (as opposed to the compressed data being decompressed prior to being stored in the cache, as described above with regard of the link compression scheme). When the techniques described above are used to increase effective cache capacity as part of cache compression, the location of the decompressor is moved from its location shown in FIG. 3 between the cache 204 and the link 304 to the location shown in phantom in FIG. 3 between the cache 204 and the higher level cache.

Figure 4:
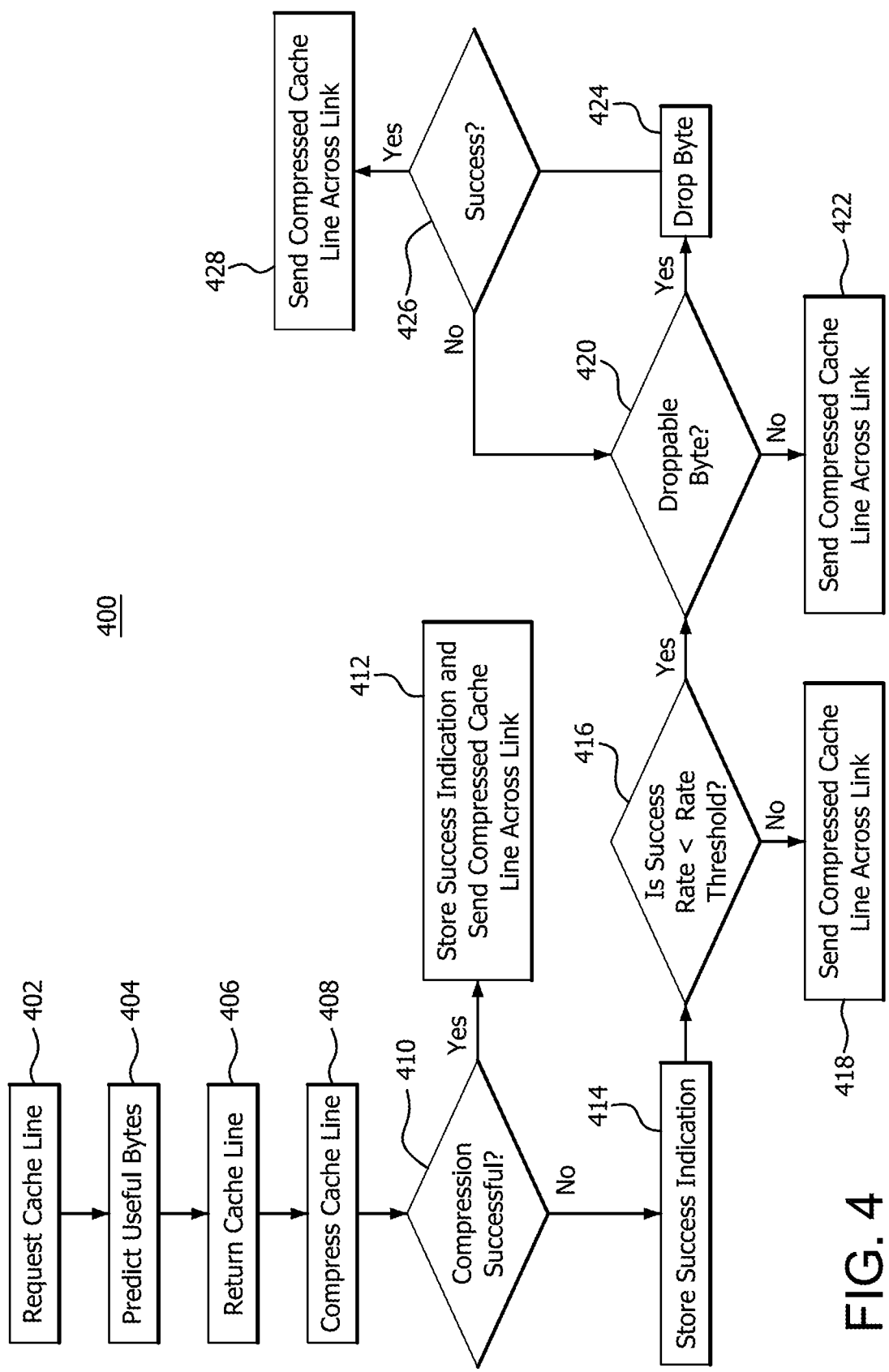
FIG. 4 is a flow diagram illustrating an example method of processing data according to features of the disclosure.

FIG. 4 is a flow diagram illustrating an example method 400 of processing data according to features of the disclosure. As shown at block 402, the method 400 includes requesting a cache line. For example, in response to a request for data, when a processor 102 does not find the data at a memory address in the cache 204, a cache miss (e.g., a last level cache miss) occurs and a request for main memory to fill a cache line is sent along with the cache line address.

As shown at block 404, the method 400 includes predicting useful bytes. Prior to sending the request to fill the cache line across an interconnect link, the number of bytes of the cache line to be accessed (i.e., the number of useful bytes) is predicted based on a number of previous accesses for each byte of the cache line. Requests (i.e., requests to access each byte of the cache line) from multiple portions (e.g., threads) of a program are monitored and stored. Based on the monitored information (e.g., number of accesses for each byte) a prediction, for each byte of the cache line, is made as to whether or not the byte will be accessed (i.e., a useful byte). For example, a prediction for each byte is made as to whether the byte is a useful byte that will be accessed during the life of the cache line (i.e., before the cache line is evicted). The request to fill the cache line, metadata (e.g., prediction information indicating which bytes are useful bytes) and the cache line address are then sent along the interconnect link.

In response to receiving the request, the metadata and the cache line address, each byte of the cache line (i.e., the full, non-compressed cache line) is returned (i.e., read) from main memory, as shown in block 406. The cache line is then compressed, at block 408, using a compression algorithm.

As shown at decision block 410, the method includes determining whether the compression algorithm has successfully compressed the cache line according to a compression parameter. When link compression is being implemented, a cache line is determined as being successfully compressed if the compressed cache line can be sent over a link in a fewer number of cycles. For instance, using the 64-byte cache line and 32-byte bus example above, the cache line is determined to be successfully compressed when the compression results in the number of bytes of the compressed cache line being reduced from 64 bytes to 32 bytes or less such that the compressed cache line can be sent over a single bus cycle. When cache compression is being implemented, a cache line is determined as being successfully compressed if the compressed cache line will result in an increased effective cache capacity.

When it is determined, at decision block 410, that the compression algorithm has successfully compressed the cache line according to the compression parameter, an indication of the successful compression is stored (e.g., a counter is updated) and the compressed cache line is sent across the link, as shown at block 412. When it is determined, at decision block 414, that the compression algorithm has not successfully compressed the cache line according to the compression parameter, an indication of the unsuccessful compression is stored (e.g., counter is updated) as shown at block 414, and a dropping byte algorithm is implemented.

The dropping byte algorithm is, for example, implemented by determining, at block 416, whether or not a compression success rate is less than a compression success rate threshold prior to determining, at block 420, whether there are any droppable bytes to drop from the cache line. Alternatively, the dropping byte algorithm is implemented by determining, at block 420, whether there are any non-useful droppable bytes to drop from the cache line without determining whether or not a compression success rate is less than a compression success rate threshold. That is, the dropping byte algorithm is implemented by omitting decision block 416 and block 418 in FIG. 4 and proceeding directly to decision block 420 in FIG. 4.

When the dropping byte algorithm includes decision block 416 and block 418, the compression success rate is determined by monitoring and recording successful compressions and unsuccessful compressions (e.g., updating the counter) over time. The determined compression success rate is compared to the compression success rate threshold.

When the compression success rate is determined, at decision block 416, to not be less than the compression success rate threshold (i.e., the cache lines are being successfully compressed according to the compression success rate threshold without dropping any bytes), the compressed cache line is sent across the link without dropping any bytes, as shown in block 418. That is, when it is determined that the compression algorithm has not successfully compressed the cache line but it is determined that the compression success rate has not fallen below the compression success rate threshold, an indication of the unsuccessful compression is stored (e.g., counter is updated), but the compressed cache line is sent across the link without implementing the dropping byte algorithm.

When the compression success rate is determined, at decision block 416, to be less than the compression success rate threshold (i.e., the cache lines are not being successfully compressed according to the compression success rate threshold without dropping any bytes), a determination is made as to whether the cache line includes any non-useful droppable bytes, as shown at decision block 420, based on the prediction information determined at block 404.

Upon determining that the cache line does not include a non-useful droppable byte, the compressed cache line is sent across the link, as shown at block 422. Upon determining that the cache line does include at least one non-useful droppable byte, the non-useful bytes are dropped, one at a time, from the cache line. For example, when the cache line is determined to include at least one non-useful droppable byte, the non-useful byte is dropped at block 424. After the non-useful byte is dropped from the cache line, a determination is made, at decision block 426, as to whether the compression becomes successful (e.g., the bytes in the cache line are reduced to 32 bytes to send across the 32-byte bus). When it is determined that the compression becomes successful, the cache line, with any dropped bytes, is sent across the link at block 428. The metadata in the compressed partial cache line is augmented with an indication (e.g., a flag) that the cache line includes dropped bytes.

When it is determined that the compression is not successful after the byte is dropped, the method 400 proceeds back to decision block 420 to determine if there are any more non-useful droppable bytes. The process is repeated until the compression is successful or until there are no more droppable bytes It should be understood that many variations are possible based on the disclosure herein. Although features and elements are described above in particular combinations, each feature or element can be used alone without the other features and elements or in various combinations with or without other features and elements.

The methods provided can be implemented in a general purpose computer, a processor, or a processor core. Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine. Such processors can be manufactured by configuring a manufacturing process using the results of processed hardware description language (HDL) instructions and other intermediary data including netlists (such instructions capable of being stored on a computer readable media). The results of such processing can be maskworks that are then used in a semiconductor manufacturing process to manufacture a processor which implements features of the disclosure.

The methods or flow charts provided herein can be implemented in a computer program, software, or firmware incorporated in a non-transitory computer-readable storage medium for execution by a general purpose computer or a processor. Examples of non-transitory computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

What is claimed is:

1. A processing device comprising:
   memory comprising:
     main memory; and
     cache memory in communication with the main memory via a link; and
   at least one processor configured to:
     receive a request for a cache line;
     read the cache line from main memory;
     compress the cache line according to a compression algorithm; and
     when the compressed cache line includes at least one byte predicted to not be accessed, drop the at least one byte from the compressed cache line based on whether the compression algorithm is determined to successfully compress the cache line according to a compression parameter.

2. The processing device according to claim 1, wherein the at least one processor is further configured to:
   predict, for each byte of the cache line, whether or not a byte will be accessed;
   send the request for the cache line across the link along with prediction information comprising the prediction of whether or not each byte will be accessed; and
   determine whether the cache line includes the at least one byte predicted to not be accessed based on the prediction information.

3. The processing device according to claim 2, wherein the at least one processor is further configured to:
   predict, for each byte of the cache line, whether or not the byte will be accessed prior to the cache line being evicted from the cache; and
   determine that the cache line includes the at least one byte predicted to not be accessed when the at least one byte is predicted to not be accessed prior to the cache line being evicted from the cache.

4. The processing device according to claim 1, wherein the compression parameter is a number of clock cycles used to send the cache line across the link; and
   the at least one processor is further configured to determine whether the compression algorithm successfully compresses the cache line based on whether the number of clock cycles used to send the cache line across the link is reduced by the compression of the cache line using the compression algorithm.

5. The processing device according to claim 1, wherein the compression parameter is an effective cache capacity of the cache; and
   the at least one processor is further configured to determine whether the compression algorithm successfully compresses the cache line based on whether the effective cache capacity of the cache is increased by the compression of the cache line using the compression algorithm.

6. The processing device according to claim 1, wherein the at least one processor is further configured to:
   determine whether or not a compression success rate is less than a compression success rate threshold;
   determine whether or not to drop the at least one byte predicted to be accessed when the compression success rate is determined to not be less than the compression success rate threshold; and
   send the compressed cache line across the link when the compression success rate is determined to be less than the compression success rate threshold.

7. The processing device according to claim 6, wherein the at least one processor is further configured to:
monitor and store, over time, requests to access each byte of the cache line from multiple portions of a program;
determine the compression success rate based on the stored requests; and
compare the compression success rate to the compression success rate threshold.

8. The processing device according to claim 1, wherein the at least one processor is further configured to:
determine whether or not the cache line includes a number of bytes which are not predicted to be accessed;
when the at least one processor determines that the cache line includes a plurality of bytes which are not predicted to be accessed, start dropping the plurality of bytes, one at a time, from the cache line;
after each one of the plurality of dropped bytes is dropped, determine whether the dropped byte causes the compression algorithm to successfully compress the cache line according to the compression parameter; and
send the compressed cache line with the at least one dropped byte across the link when it is determined that the compression algorithm successfully compresses the cache line according to the compression parameter.

9. The processing device according to claim 1, wherein the at least one processor is further configured to:
identify at least one invalid byte, which is requested to be accessed after the cache line is sent across the link with at least one dropped byte, by using an associated write mask of the at least one dropped byte; and
invalidate the cache line when the at least one invalid byte is identified.

10. A data processing method comprising:
receiving a request for a cache line;
reading the cache line from main memory;
compressing the cache line according to a compression algorithm; and
when the compressed cache line includes at least one byte predicted to not be accessed, dropping the at least one byte from the compressed cache line based on whether the compression algorithm is determined to successfully compress the cache line according to a compression parameter.

11. The method according to claim 10, further comprising:
predicting, for each byte of the cache line, whether or not a byte will be accessed;
sending the request for the cache line across the link along with prediction information comprising the prediction of whether or not each byte will be accessed; and
determining whether the cache line includes at least one byte which is predicted not to be accessed based on the prediction information.

12. The method according to claim 11, further comprising:
predicting, for each byte of the cache line, whether or not a byte will be accessed prior to the cache line being evicted from the cache; and
determining that the cache line includes the at least one byte predicted to not be accessed when the at least one byte is predicted to not be accessed prior to the cache line being evicted from the cache.

13. The method according to claim 10, wherein
the compression parameter is a number of clock cycles used to send the cache line across the link; and
the method further comprises determining whether the compression algorithm successfully compresses the cache line based on whether the number of clock cycles used to send the cache line across the link is reduced by the compression of the cache line using the compression algorithm.

14. The method according to claim 10, wherein
the compression parameter is an effective cache capacity of the cache; and
the method further comprises determining whether the compression algorithm successfully compresses the cache line based on whether the effective cache capacity of the cache is increased by the compression of the cache line using the compression algorithm.

15. The method according to claim 10, further comprising:
determining whether or not a compression success rate is less than a compression success rate threshold;
determine whether or not to drop the at least one byte predicted to be accessed when the compression success rate is determined to not be less than the compression success rate threshold; and
send the compressed cache line across the link when the compression success rate is determined to be less than the compression success rate threshold.

16. The method according to claim 15, further comprising:
monitoring and storing, over time, requests to access each byte of the cache line from multiple portions of a program;
determining the compression success rate based on the stored requests; and
comparing the compression success rate to the compression success rate threshold.

17. The method according to claim 10, further comprising:
determining whether or not the cache line includes a number of bytes which are not predicted to be accessed;
when the at least one processor determines that the cache line includes a plurality of bytes which are not predicted to be accessed, start dropping the plurality of bytes, one at a time, from the cache line;
after each one of the plurality of dropped bytes is dropped, determining whether the dropped byte causes the compression algorithm to successfully compress the cache line according to the compression parameter; and
sending the compressed cache line with the at least one dropped byte across the link when it is determined that the compression algorithm successfully compresses the cache line according to the compression parameter.

18. The method according to claim 10, further comprising:
identifying at least one invalid byte, which is requested to be accessed after the cache line is sent across the link with at least one dropped byte, by using an associated write mask of the at least one dropped byte; and
invalidating the cache line when the at least one invalid byte is identified.

19. A non-transitory computer readable medium having instructions for causing a computer to execute a data processing method comprising:
receiving a request for a cache line;
reading the cache line from main memory;
compressing the cache line according to a compression algorithm; and
when the compressed cache line includes at least one byte predicted to not be accessed, dropping the at least one byte from the compressed cache line based on whether the compression algorithm is determined to successfully compress the cache line according to a compression parameter.

20. The computer readable medium according to claim 19, wherein the instructions further comprise:
predicting, for each byte of the cache line, whether or not a byte will be accessed;
sending the request for the cache line across the link along with prediction information comprising the prediction of whether or not each byte will be accessed; and
determining whether the cache line includes at least one byte which is predicted not to be accessed based on the prediction information.

\* \* \* \* \*